(12) United States Patent
Terashima et al.

(10) Patent No.: US 7,352,828 B2
(45) Date of Patent: Apr. 1, 2008

(54) RECEIVING APPARATUS AND RECEIVING METHOD

(75) Inventors: Kazuhiko Terashima, Tokyo (JP); Taku Nagase, Tokyo (JP); Makoto Natori, Saitama (JP)

(73) Assignee: Sony Corporation (JP)

( * ) Notice: Subject to any disclaimer, the term of this patent is extended or adjusted under 35 U.S.C. 154(b) by 965 days.

(21) Appl. No.: 10/204,931

(22) PCT Filed: Dec. 13, 2001

(86) PCT No.: PCT/JP01/10947

§ 371 (c)(1),
(2), (4) Date: Oct. 15, 2002

(87) PCT Pub. No.: WO02/49251

PCT Pub. Date: Jun. 20, 2002

(65) Prior Publication Data

US 2003/0091130 A1 May 15, 2003

(30) Foreign Application Priority Data

Dec. 13, 2000 (JP) ............................. 2000-379282

(51) Int. Cl.
*H04L 27/06* (2006.01)
(52) U.S. Cl. ...................... 375/340; 375/316; 375/136; 375/324
(58) Field of Classification Search ................ 375/340, 375/316, 136, 324; 370/342
See application file for complete search history.

(56) References Cited

U.S. PATENT DOCUMENTS 6,185,200 B1 * 2/2001 Prasad ........................ 370/342
6,345,046 B1 * 2/2002 Tanaka ........................ 370/342

\* cited by examiner

*Primary Examiner*—Mohammed Ghayour
*Assistant Examiner*—Leila Malek
(74) *Attorney, Agent, or Firm*—Lerner, David, Littenberg, Krumholz & Mentlik, LLP

(57) ABSTRACT

The present invention provides a receiving apparatus and method in which frequency of calculation such as weighting multiplication and memory capacity of a frame buffer can be reduced. To this end, reference phase information and data are separated by a reference phase inverse spreading unit (106) and a data portion inverse spreading unit (107), respectively. A weighting coefficient calculating unit (115) calculates weighting coefficients based on SNR values as transmission line information from an SNR calculating unit (114) and sends calculated weighting coefficients to a multiplier (109), where phase correction values based on the reference phase information are multiplied by the weighting coefficients to be correction coefficients. A multiplier (111) multiplies reception data from the data portion inverse speading unit (107) by the correction coefficients, and output data from the multiplier (111) is restricted in bit width by the bit width restricting unit (112) The output data which is restricted in bit width from a coherent receiving unit (101) and that of a coherent receiving unit (121) are added by an adder (117), and the output data from the adder (117) is sent to a frame buffer (118) to be stored. Then, the output data from the frame buffer (118) is sent to a soft decision input error correcting unit (120).

2 Claims, 4 Drawing Sheets

RECEIVING APPARATUS AND RECEIVING METHOD

CROSS REFERENCE TO RELATED APPLICATIONS

This application is a 371 of PCT/JP01/10947 filed Dec. 13, 2001, which claims priority to Japanese Patent Application No. 2000-379282 filed Dec. 13, 2000, the disclosures of which are hereby incorporated by reference herein.

TECHNICAL FIELD

The present invention relates to a receiving apparatus and a receiving method applicable to a mobile communication system, etc., and in particular, to a receiving apparatus and a receiving method which performs coherent demodulation using reference phase information.

BACKGROUND ART

In the CDMA (Code Division Multiple Access) method which is employed in a mobile communication system such as the portable telephone system, pilot signals are used as phase reference in performing coherent demodulation. The pilot signals are transmitted by dedicated pilot channels which are different from those for transmitting data of such as audio information.

Also, in other transmission methods and multiplexing methods, etc., reference phase information and data are concurrently transmitted, and the reference phase information is separated by a receiving apparatus to perform coherent reception.

Hereinafter, a receiving apparatus which performs coherent demodulation using reference phase information will be explained with reference to the accompanying drawing.

FIG. 2. shows a block diagram of a receiving apparatus which is adapted for performing coherent reception, which has two coherent receiving units of a coherent receiving unit 201 and a coherent receiving unit 221.

In FIG. 2, the coherent receiving unit 201 includes an antenna 202 for receiving radio waves, an RF (Radio Frequency) receiving unit 203 for receiving signals from the antenna 202, an orthogonal modulator 204 for orthogonal-modulating signals from the RF receiving unit 203, an AD converter 205 for converting analog signals from the orthogonal modulator 204 to digital data, a reference phase inverse spreading unit 206 and a data portion inverse spreading unit 207 which receive output data from the AD converter 205 respectively, a phase correction value calculating unit 208 which receives data from the reference phase inverse spreading unit 206, and a multiplier 209 for multiplying output data or reception data from the data portion inverse spreading unit 207 by output data or phase correction information from the phase correction value calculating unit 208. And, output data from the multiplier 209 is output from the coherent receiving unit 201. Also, the configuration of the coherent receiving unit 221 is similar to that of the coherent receiving unit 201, the explanation of which is omitted.

Output data from the coherent receiving unit 201 and that of the coherent receiving unit 221 are added by an adder 210, and output data from the adder 210 is sent to a frame buffer 211 to be stored. When the amount of output data from the coherent receiving units 201 and 221 stored in the frame buffer 211 comes to a predetermined unit, for example, 1 unit to perform soft decision input error correction, to be described later, data stored in the frame buffer 211 is sent to a multiplier 214. Also, the respective output data from the reference phase inverse spreading unit 206 and the data portion inverse spreading unit 207 of the coherent receiving unit 201 and those from a reference phase inverse spreading unit and a data portion inverse spreading unit of the coherent receiving unit 221 are sent to an SNR calculating unit 212, where the SNR (Signal to Noise Ratio) is calculated. Then, thus calculated SNR is sent to a weighting coefficient calculating unit 213. Weighting coefficients from the weighting coefficient calculating unit 213 are sent to the multiplier 214, where output data from the frame buffer 211 is multiplied by the weighting coefficients. Thus multiplied output data from the multiplier 214 is sent to a bit width restricting unit 216. Also, output data from the SNR calculating unit 212 is sent to a bit width calculating unit 215, where bit width is calculated. Then, output data from the bit width calculating unit 215 is sent to the bit width restricting unit 216, where bit width of output data from the multiplier 214 is restricted. Output data from the bit width restricting unit 216 is sent to a deinterleaver 217 to be deinterleaved, and output data from the deinterleaver 217 is sent to a soft decision input error correcting unit 218.

As described above, output data from the frame buffer 211 is multiplied by the weighting coefficients from the weighting coefficient calculating unit 213, and this processing is intended so as to improve reception characteristics. The following is how the reception characteristics are improved.

For example, it is assumed that data of 1 block unit or the 1 unit is convolutional-encoded and interleaved to be transmitted, and a receiving apparatus of the configuration shown in FIG. 2 receives thus transmitted signals, and then data of 1 block unit is deinterleaved to be viterbi-decoded so as to restore original data. In this case, when taking notice of 1 bit of original data, information of this 1 bit is included in encoded bit of ((confinement length +1)/encoding rate) after convolutional-encoding, and then information of this 1 bit is scattered over 1 block for transmission and reception after interleaving. When 1 block for transmission and reception is divided into N divisional blocks each of equal size and SNR (Signal to Noise Ratio) is calculated, error of data in divisional blocks of high SNR is small since transmission state thereof is desirable, while error of data in divisional blocks of low SNR is large since transmission state thereof is undesirable. Based on this information, by multiplying reception intensity values of reception data by weighting values calculated for each divisional block of a block, using large weighting values for high SNR and small weighting values for low SNR, and deinterleaving data of the block so as to restore original data, influence of data with large error can be reduced. That is, it becomes possible to improve bit error rate after viterbi-decoding by using data with small error.

Conventionally, in performing coherent reception, reception data is multiplied by phase correction information, and resulting data undergoes buffering under a frame buffer. Then, weighting coefficients for performing soft decision input error correction are calculated using values based on SNR of reception data, and then output data from the frame buffer is multiplied by the weighting coefficients at the upstream stage of a soft decision input error correcting unit.

So, in this conventional manner, two times of multiplication, that is multiplication for phase correction and that for weighting, is required for one of data.

Furthermore, in performing buffering for data which has undergone multiplication for phase correction, since bit width of data is caused to be enlarged due to wide dynamic range, downstream circuits of a multiplier and a RAM are caused to be enlarged in size.

Specifically, in FIG. 2, each of the two coherent receiving units, or the coherent receiving unit 201 and the coherent receiving unit 221, performs two times of multiplication, that is, multiplication for phase correction at the multiplier 209 and multiplication for weighting at the multiplier 214, and circuits of the adder 210 and the frame buffer 211 are caused to be enlarged in size due to enlarged bit width.

DISCLOSURE OF THE INVENTION

Accordingly, the present invention has an object to overcome the above-mentioned drawbacks of the prior art by providing a receiving apparatus and a receiving method in which frequency of calculation such as multiplication can be reduced and circuits of a memory, etc. can be reduced in size.

The above object can be attained by providing a receiving apparatus and a receiving method for receiving signals including reference phase information and data which are concurrently transmitted, which
  separate the reference phase information and the data from received signals;
  calculate phase correction values based on the separated reference phase information;
  calculate weighting coefficients based on the received signals;
  calculate correction coefficients based on the phase correction values and the weighting coefficients;
  multiply the separated data by the correction coefficients;
  restrict bit width of multiplied output data from the multiplying processing;
  store data of a predetermined unit from the bit width restricting processing; and
  correct errors of output data from the storing processing.

According to the present invention, phase correction values based on the reference phase information are multiplied by weighting coefficients, which are calculated based on SNR (Signal to Noise Ratio) of the received signals, in advance to be correction coefficients, and the separated data is multiplied (phase correction multiplication) by thus obtained correction coefficients. So, frequency of calculation such as multiplication can be reduced. Also, bit width of multiplied output data is restricted, that is, bit width is restricted due to scaling effect. So, frequency of calculation at the downstream stage such as multiplication can be reduced, and memory capacity of a frame buffer can be reduced.

These objects and other objects, features and advantages of the present invention will become more apparent from the following detailed description of the preferred embodiments of the present invention.

BEST MODE FOR CARRYING OUT THE INVENTION

The present invention will further be described below concerning the best modes with reference to the accompanying drawings.

Figure 1:
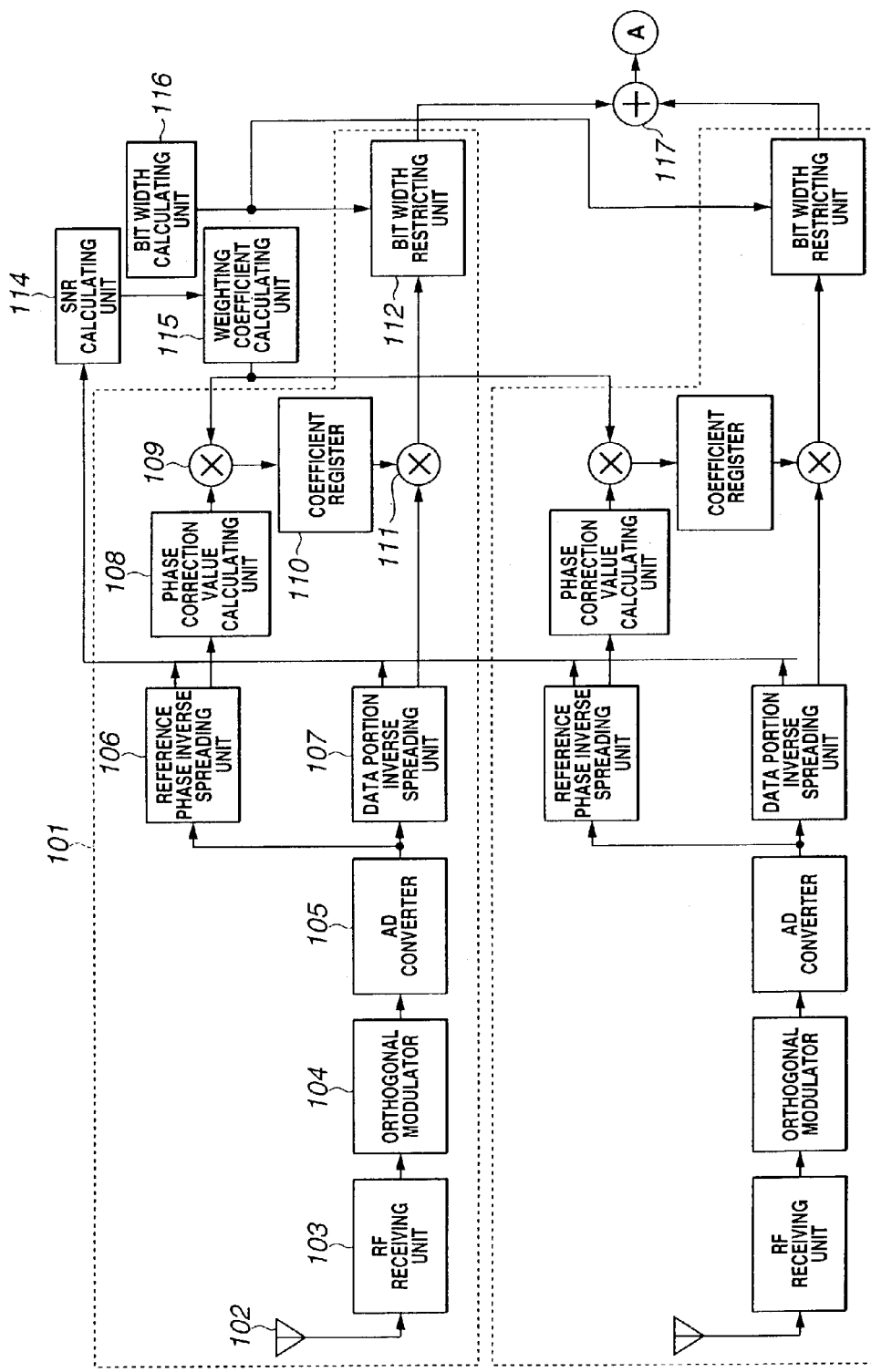
FIG. 1. shows a block diagram of a receiving apparatus of the present invention.
Figure 1:
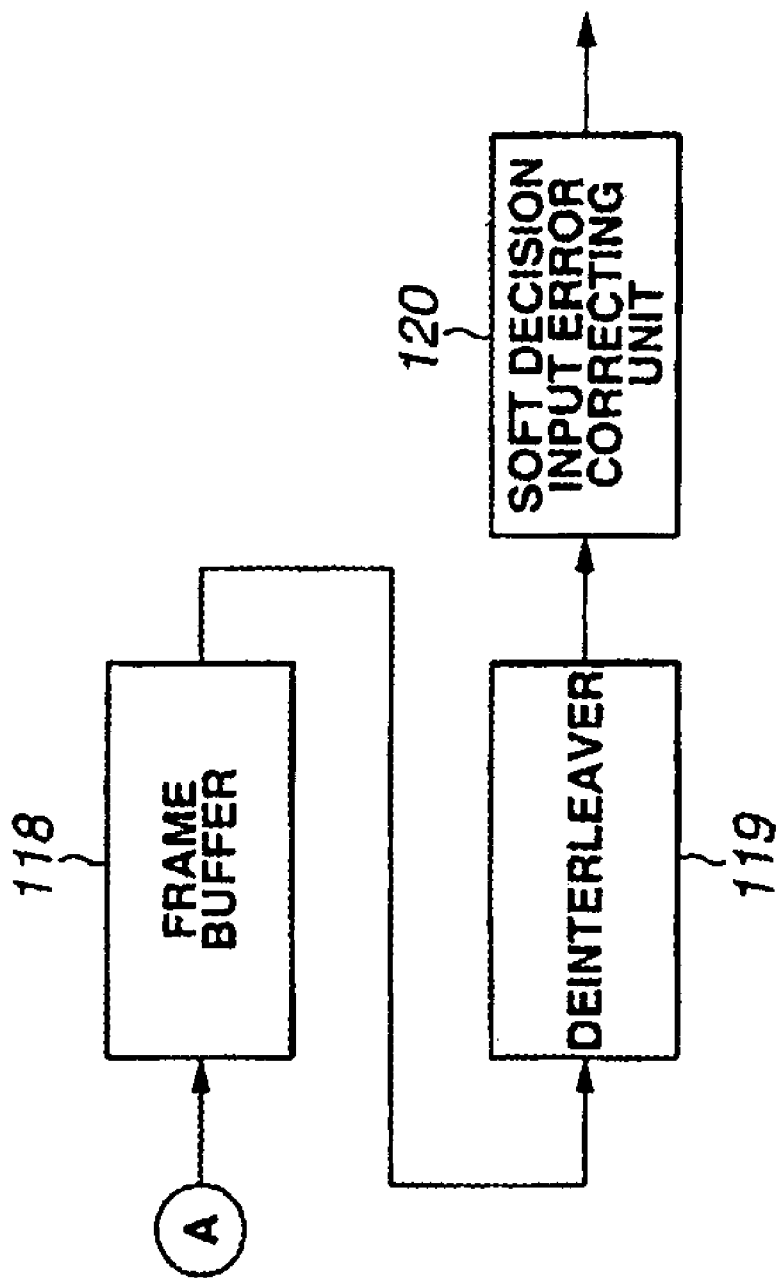

FIG. 1. shows a block diagram of a receiving apparatus employing the CDMA (Code Division Multiple Access) method, which has two coherent receiving units of a coherent receiving unit 101 and a coherent receiving unit 121. In this specific embodiment, pilot signals of a predetermined signal pattern are used as phase reference, and are transmitted by dedicated pilot channels which are different from those for transmitting data of such as audio information. On the other hand, the present invention is not restricted to this case, and is applicable to the case in which, for example, data and reference phase information are multiplexed to be arranged on different positions on the time domain to be transmitted. That is, the present invention can be applicable to the case in which data and reference phase information are concurrently transmitted, and thus transmitted data and reference phase information can be separated or demultiplexed by a receiving apparatus.

In FIG. 1, the coherent receiving unit 101 includes an antenna 102 for receiving radio waves, an RF (Radio Frequency) receiving unit 103 for receiving signals from the antenna 102, an orthogonal modulator 104 for orthogonal-modulating signals from the RF receiving unit 103, an AD converter 105 for converting analog signals from the orthogonal modulator 104 to digital data, a reference phase inverse spreading unit 106 and a data portion inverse spreading unit 107 which receive output data from the AD converter 105 respectively, a phase correction value calculating unit 108 which receives data from the reference phase inverse spreading unit 106, a multiplier 109 which receives output data or phase correction information from the phase correction value calculating unit 108 to multiply the phase correction information by weighting coefficients to be described later, a coefficient register 110 which receives output data or correction coefficients from the multiplier 109 to store the correction coefficients, and a multiplier 111 for multiplying output data or reception data from the data portion inverse spreading unit 107 by output data or correction coefficients from the coefficient register 110, and a bit width restricting unit 112 which receives output data from the multiplier 111. And, output data from the bit width restricting unit 112 is output from the coherent receiving unit 101. Also, the configuration of the coherent receiving unit 121 is similar to that of the coherent receiving unit 101, the explanation of which is omitted.

Output data from the coherent receiving unit 101 and that of the coherent receiving unit 121 are added by an adder 117, and output data from the adder 117 is sent to a frame buffer 118 to be stored. Output data from the frame buffer 118 is sent to a deinterleaver 119 to be deinterleaved, and output data from the deinterleaver 119 is sent to a soft decision input error correcting unit 120. Then, output data whose error is corrected is output from the soft decision input error correcting unit 120.

Also, the respective output data for obtaining transmission line information from the reference phase inverse spreading unit 106 and the data portion inverse spreading unit 107 of the coherent receiving unit 101 and those for obtaining transmission line information from a reference phase inverse spreading unit and a data portion inverse spreading unit of the coherent receiving unit 121 are sent to an SNR calculating unit 114, where the SNR (Signal to Noise Ratio) is calculated. Then, thus calculated SNR is sent to a weighting coefficient calculating unit 115. Weighting coefficients from the weighting coefficient calculating unit 115 are sent to the multiplier 109 of the coherent receiving unit 101, where output data from the phase correction value calculating unit 108 is multiplied by the weighting coefficients to be collection coefficients. This data flow and processing in the coherent receiving unit 121 is similar to that of the coherent receiving unit 101.

Also, output data from the SNR calculating unit 114 is sent to a bit width calculating unit 116, where bit width is calculated. Then, output data from the bit width calculating unit 116 is sent to the bit width restricting unit 112 of the coherent receiving unit 101 and to a bit width restricting unit of the coherent receiving unit 121.

Next, the operation of the receiving apparatus of the configuration shown in FIG. 1 will be explained.

In the coherent receiving unit 101, signals from the RF receiving unit 103, which are received by the antenna 102, are orthogonal-modulated by the orthogonal modulator 104 to be complex baseband signals. Then the complex baseband signals are converted to digital data by the AD converter 105. Reference phase information and data are spread by different spreading codes or PN (pseudo noise) codes, and are transmitted by channels different from each other, that is pilot channels and traffic channels. And, by performing inverse spreading using corresponding spreading codes, reference phase information is separated by the reference phase inverse spreading unit 106, while data is separated by the data portion inverse spreading unit 107.

Reference phase information from the reference phase inverse spreading unit 106 is sent to the phase correction value calculating unit 108, where phase correction values are calculated. Also, the SNR calculating unit 114 calculates SNR values as transmission line information based on reference phase information from the reference phase inverse spreading unit 106 and data from the data portion inverse spreading unit 107. Then, the weighting coefficient calculating unit 115 calculates weighting coefficients based on the SNR values. Then, multiplier 109 multiplies phase correction values from the phase correction value calculating unit 108 by weighting coefficients from the weighting coefficient calculating unit 115, and sends resulting data to the coefficient register 110. Then, the coefficient register 110 stores output data from the multiplier 109 as correction coefficients. Then, the coefficient register 110 sends correction coefficients to the multiplier 111, and the multiplier 111 multiplies output data or reception data from the data portion inverse spreading unit 107 by thus sent correction coefficients. That is, instead of directly multiplying reception data by weighting coefficients, as is the conventional manner, firstly, phase correction values are multiplied by weighting coefficients to generate correction coefficients, then, reception data is multiplied by thus generated correction coefficients. As will be explained later, multiplication at the multiplier 111 is performed every data, while multiplication at the multiplier 109 is performed every time the SNR is updated. Thus, frequency of multiplication can be reduced.

Output data from the multiplier 111 is sent to the bit width restricting unit 112, where bit width of data is so restricted as to be optimum in performing error correction at the downstream stage. Bit width restriction information which decides the positions of bits to be taken out from data at the bit width restricting unit 112 is calculated by the bit width calculating unit 116 using output data from the SNR calculating unit 114. And, output data from the bit width restricting unit 112 is output from the coherent receiving unit 101 to the adder 117.

Also, the operation of the coherent receiving unit 121 is similar to that of the coherent receiving unit 101, the explanation of which is omitted.

Output data from the coherent receiving unit 101 and that from the coherent receiving unit 121 are sent to be added by the adder 117, and output data from the adder 117 is sent to the frame buffer 118 to be stored. When the amount of thus stored data comes to a predetermined unit, for example, 1 unit to perform soft decision input error correction by the soft decision input error correcting unit 120, data stored in the frame buffer 118 is sent to the deinterleaver 119 to be deinterleaved. Then, output data from the deinterleaver 119 is sent to the soft decision input error correcting unit 120. The soft decision input error correcting unit 120 performs error correction using viterbi-algorithm based on the 1 unit.

As described above, weighting based on transmission line information such as SNR of reception data is performed for input data to the soft decision input error correcting unit 120, and this processing is intended so as to improve reception characteristics. That is, when 1 block or the 1 unit for transmission and reception is divided into N divisional blocks each of equal size and SNR (Signal to Noise Ratio) is calculated, error of data in divisional blocks of high SNR is small since transmission state thereof is desirable, while error of data in divisional blocks of low SNR is large since transmission state thereof is undesirable. Thus, by multiplying reception data by weighting values calculated for each divisional block of a block, using large weighting values for high SNR and small weighting values for low SNR, and deinterleaving data of the block so as to restore original data, via necessary processing, influence of data with large error can be reduced. So, it becomes possible to improve bit error rate after viterbi-decoding at the soft decision input error correcting unit 120 by using data with small error. In the embodiment shown in FIG. 1, phase correction values are multiplied by weighting values based on the SNR to be correction coefficients, and reception data is multiplied by the correction coefficients.

Next, frequency of multiplication of thus configured receiving apparatus shown in FIG. 1 will be explained.

Figure 2:
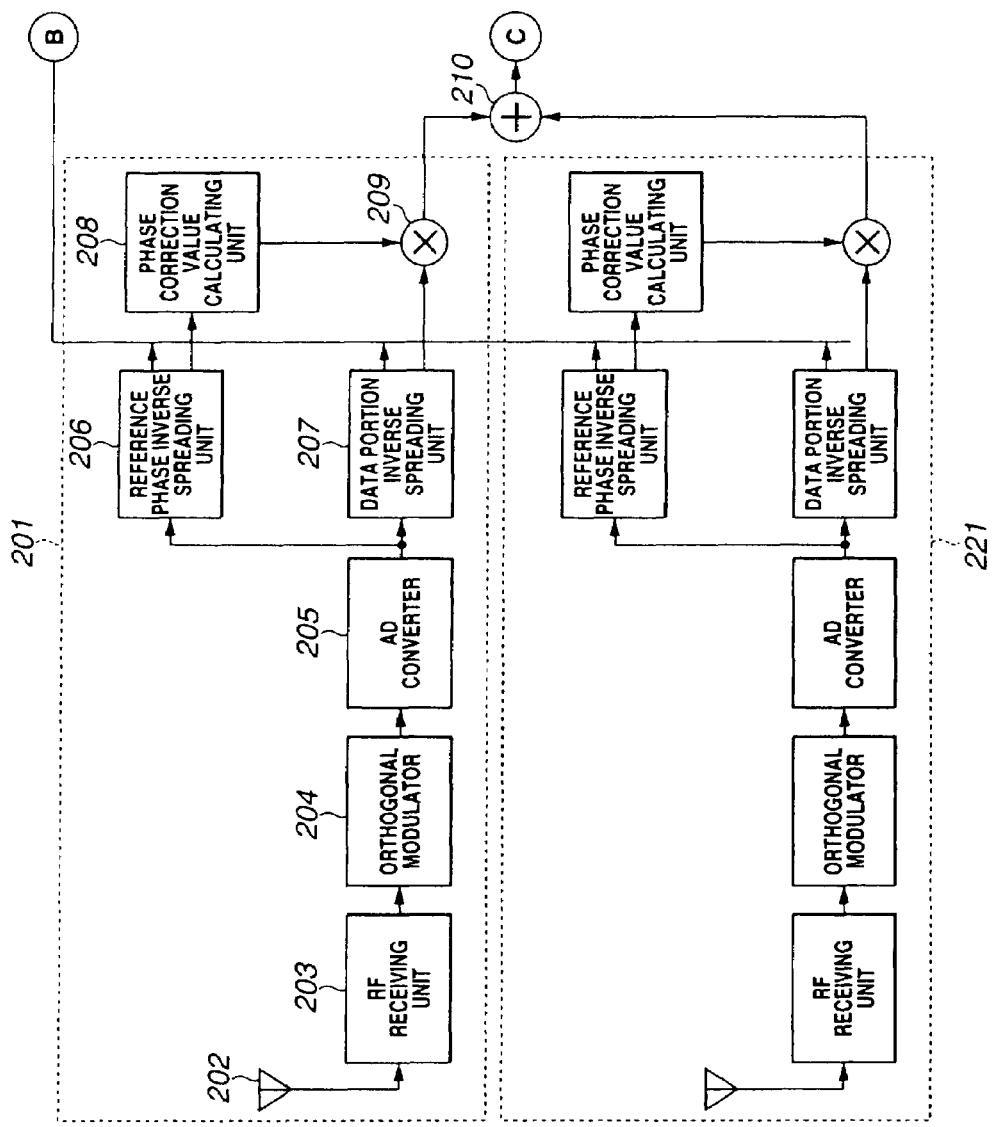
FIG. 2. shows a block diagram of a conventional receiving apparatus employing the CDMA method.
Figure 2:
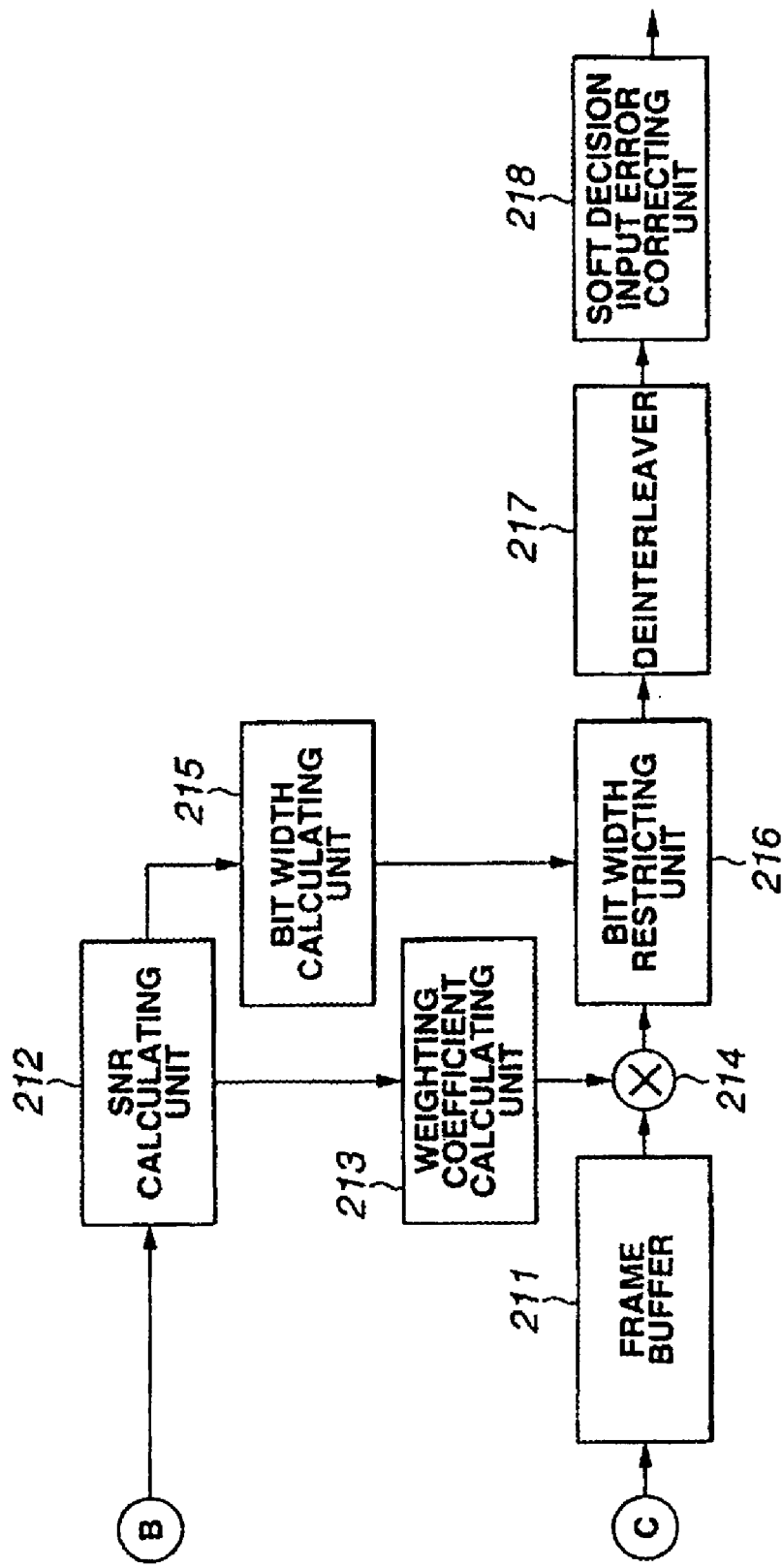

The relationship between the symbol number Nr of the 1 unit of reference phase information output from the reference phase inverse spreading unit 106 and the symbol number Nd of the 1 unit of output data from the data portion inverse spreading unit 107 is Nr<Nd. Thus, in the conventional receiving apparatus shown in FIG. 2, since frequency of multiplication of the multiplier 209 is Nd times, frequency of multiplication of two coherent receiving units of the coherent receiving unit 201 and the coherent receiving unit 221 becomes 2×Nd times. And, frequency of multiplication of the multiplier 214 is Nd times. So, total frequency of multiplication of the 1 unit of the conventional receiving apparatus is 3×Nd times. On the other hand, in the receiving apparatus of the present invention shown in FIG. 1, multiplication is performed at the multiplier 109 and the multiplier 111. Since frequency of multiplication of the multiplier 109 is Nr times and frequency of multiplication of the multiplier 111 is Nd times, frequency of multiplication of two coherent receiving units of the coherent receiving unit 101 and the coherent receiving unit 121 becomes 2×(Nr+Nd) times, which is total frequency of multiplication of the 1 unit of the receiving apparatus of the present invention. In case Nr=10, and Nd=1000, total frequency of multiplication of the 1 unit of the conventional receiving apparatus shown in FIG. 2 is 3000 times, while that of the receiving apparatus shown in FIG. 1 of the present invention is 2020 times. So, multiplication of 980 times can be reduced.

Generally, in case Nr<Nd/2, multiplication of (Nd−2×Nr) times can be reduced. In case Nr<<Nd, the effect of reduction of multiplication becomes large, in which case multiplication of approximately Nd times can be reduced.

Next, bit width in operation of multiplication, addition, etc. will be explained. It is assumed that, as a specific example of bit width necessary in the receiving apparatus, output data from the AD converter 105 is of 8 bits, output data from the reference phase inverse spreading unit 106 and that of the data portion inverse spreading unit 107 are of 8 bits, phase correction values from the phase correction value calculating unit 108 are of 8 bits, weighting coefficients from the weighting coefficient calculating unit 115 are of 8 bits, and input data to the soft decision input error correcting unit 120 is of 6 bits.

In the conventional receiving apparatus shown in FIG. 2, since output data from the data portion inverse spreading unit 207 is of 8 bits and phase correction values from the phase correction value calculating unit 208 are of 8 bits, output data from the multiplier 209 is of 16 bits. Then, output data from the multiplier 209 of the coherent receiving unit 201 and that from a multiplier of the coherent receiving unit 221 are added by the adder 210 to be data of 17 bits, and output data from the adder 210 is sent to the frame buffer 211 to be stored. Then, output data from the frame buffer 211 is multiplied by weighting coefficients of 8 bits from the weighting coefficient calculating unit 213 to be data of 25 bits. Then, output data from the multiplier 214 is restricted in bit width by the bit width restricting unit 216 to be data of 6 bits, and output data from the bit width restricting unit 216 is sent to the soft decision input error correcting unit 218.

On the other hand, in the receiving apparatus of the present invention shown in FIG. 1, since phase correction values from the phase correction value calculating unit 108 are of 8 bits and weighting coefficients from the weighting coefficient calculating unit 115 are of 8 bits, output data from the multiplier 109 is of 16 bits. And, output data from the multiplier 109 is sent to the coefficient register 110 to be stored. Then, output data of 8 bits from the data portion inverse spreading unit 107 is multiplied by coefficients of 16 bits from the coefficient register 110 at the multiplier 111 to be data of 24 bits. Then, output data from the multiplier 111 is restricted in bit width by the bit width restricting unit 112 to be data of 6 bits. And, output data from the bit width restricting unit 112 of the coherent receiving unit 101 and that from a bit width restricting unit of the coherent receiving unit 121 are added and rounded by the adder 117 to be data of 6 bits, and output data from the adder 117 is sent to the frame buffer 118 to be stored.

Thus, in the conventional receiving apparatus shown in FIG. 2, bit width of the frame buffer 211 is required to be 25 bits, while in the receiving apparatus of the present invention shown in FIG. 1, bit width of the frame buffer 118 is required to be 6 bits. So, the size of a memory such as a RAM can be reduced in size to be approximately ¼.

As has been described hereinbefore, according to the present invention, in multiplying reception data (data from a data portion inverse spreading unit) by weighting coefficients based on transmission line information such as SNR, phase correction values are multiplied by weighting coefficients in advance to be correction coefficients, and reception data is multiplied by thus generated correction coefficients. Thus, frequency of multiplication can be reduced. Furthermore, thus multiplied output data is restricted in bit width and then added to output data from another coherent receiving unit to be stored to a frame buffer. Thus, memory capacity of the frame buffer can be reduced. So, power consumption of a receiving apparatus such as a portable telephone can be reduced, and cost of hardware can also be reduced.

The present invention is not restricted to the above-described case. In the above-described embodiment, data and reference phase information are transmitted by channels different from each other. On the other hand, the present invention is not restricted to this case, and is applicable to the case in which data and reference phase information are multiplexed to be arranged on different positions on the time domain to be transmitted. Also, the number of coherent receiving units is not restricted to two, and can be three or more. Furthermore, various modifications can be possible without departing from the spirit and scope of the present invention.

INDUSTRIAL APPLICABILITY

As in the above, according to the present invention, phase correction values based on reference phase information are multiplied by weighting coefficients in advance to be correction coefficients, and separated data is multiplied by thus obtained correction coefficients. Thus, frequency of calculation such as multiplication can be reduced, and circuits of a memory, etc. can be reduced in size.

The invention claimed is:

1. A receiving apparatus that receives signals including reference phase information and data that are concurrently transmitted, comprising:
   a first coherent receiving unit having:
      means for separating the reference phase information and the data from received signals;
      means for calculating phase correction values based on the separated reference phase information;
      means for calculating weighting coefficients based on the received signals;
      means for calculating correction coefficients based on the phase correction values and the weighting coefficients;
      means for multiplying the separated data by the correction coefficients;
      means for restricting bit width of multiplied data output from the means for multiplying;
      means for storing data of a predetermined unit from the means for restricting bit width; and
      means for correcting errors in data output from the means for storing data; and
   a second coherent receiving unit having means for separating, means for calculating phase correction values, means for calculating correction coefficients, means for multiplying, and means for restricting a bit width as in the first coherent receiving unit,
   wherein output data from the first and second coherent receiving units are added to be stored in the means for storing data.

2. A receiving method to receive signals including reference phase information and data that are concurrently transmitted, comprising the steps of:
   separating the reference phase information and the data from received signals;
   calculating phase correction values based on the separated reference phase information;
   calculating weighting coefficients based on the received signals;
   calculating correction coefficients based on the phase correction values and the weighting coefficients;
   multiplying the separated data by the correction coefficients;
   restricting a bit width of multiplied output data from the multiplying step;

storing data of a predetermined unit from the bit width restricting step; and correcting errors of data output from the storing step, in which the receiving method is performed by a receiving apparatus having a plurality of coherent receiving units each performing the separating step, the calculating phase correction values step, the calculating correction coefficients step, the multiplying step, and the restricting a bit width step, wherein output data from the respective coherent receiving units are added to be stored in the storing data step.

* * * * *